United States Patent Office 2,933,532
Patented Apr. 19, 1960

2,933,532

SUBSTITUTED 1-PHENYL-2-HYDRAZINO-PROPANES

Edward L. Schumann, Kalamazoo Township, Kalamazoo County, Mich., assignor to The Upjohn Company, Kalamazoo, Mich., a corporation of Delaware No Drawing. Application June 26, 1959
Serial No. 823,017

7 Claims. (Cl. 260—569)

This invention relates to novel derivatives of hydrazine and is more particularly concerned with derivatives of 1-alkoxyphenyl-2-hydrazinopropanes and acid addition salts thereof, and with processes for their preparation.

This application is a continuation-in-part of application Serial No. 794,245, filed February 19, 1959, now abandoned.

The novel compounds of the invention can be represented by the following general formula:

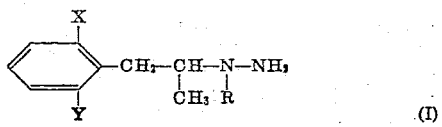

wherein X represents alkoxy containing from 1 to 3 carbon atoms, inclusive, Y is selected from the class consisting of hydrogen and alkoxy containing from 1 to 3 carbon atoms, inclusive, and R is selected from the class consisting of hydrogen and alkyl containing from 1 to 3 carbon atoms, inclusive.

The term "alkoxy containing from 1 to 3 carbon atoms, inclusive," includes methoxy, ethoxy, propoxy, and isopropoxy groups. The term "alkyl containing from 1 to 3 carbon atoms, inclusive," includes methyl, ethyl, propyl, and isopropyl groups.

The compounds of the invention having the Formula I above can exist in free base form or in the form of acid addition salts. It is to be understood that both the free base form and the acid addition salts fall within the scope of the present invention.

The novel compounds of the invention exhibit valuable pharmacological activity. Illustratively, the compounds of the invention are enzyme inhibitors. Thus, for example, the compounds 1-(o-methoxyphenyl)-2-hydrazinopropane hydrochloride, 1-(o,o'-dimethoxyphenyl)-2-hydrazinopropane hydrochloride, and 1-(o-methoxy-α-methylphenethyl)-1-methylhydrazine hydrochloride inhibit the enzyme system, monoamine oxidase, and are active, when administered orally, in inhibiting this enzyme system in the brain and liver. Monoamine oxidase is responsible for the destruction in the body of a number of physiologically active amines, including serotonin, and hence compounds which inhibit this enzyme system provide a means of regulating the rate at which said amines are destroyed in the body. Further, the compounds 1-(o-methoxyphenyl)-2-hydrazinopropane hydrochloride, 1-(o,o'-dimethoxyphenyl)-2-hydrazinopropane hydrochloride, and 1-(o-methoxy-α-methylphenethyl)-1-methylhydrazine hydrochloride are also potent inhibitors of decarboxylase enzymes. For example, the compounds inhibit the system 5-hydroxytryptophan decarboxylase which is responsible for the conversion of 5-hydroxytryptophan to serotonin in the body. [Udenfriend et al., J. Biol. Chem. 224, 803 (1957)]. Whilst the precise role which serotonin plays in the complex series of chemical reactions occurring in the brain, both normal and abnormal, is not yet clear, it is becoming increasingly evident that serotonin does have a significant effect on the manner in which the brain functions, and may be a causative agent in mental disease. 5-hydroxytryptophan is known to be the precursor of serotonin released in the brain [serotonin itself does not cross the blood-brain barrier; see Fed. Proc. 15, 402 and 493 (1957)].

Hence the compounds of the invention, which inhibit both the enzyme responsible for the formation of serotonin and also the enzyme responsible for its destruction, provide a means of regulating the supply of serotonin to the brain and also of regulating the rate at which the serotonin in the brain is destroyed.

The novel compounds of the invention also inhibit other decarboxylases. Illustratively, 1-(o-methoxyphenyl)-2-hydrazinopropane hydrochloride, 1-(o,o'-dimethoxyphenyl)-2-hydrazinopropane hydrochloride, and 1-(o-methoxy-α-methylphenethyl)-1-methylhydrazine hydrochloride, inhibit the enzyme system dihydroxyphenylalanine decarboxylase and like decarboxylases, thus providing means of regulating bodily levels, including brain levels, of pharmacologically active amines such as dopamine, epinephrine, and norepinephrine. The regulation of serotonin, dopamine, epinephrine, norepinephrine, etc., is useful in the management of abnormal conditions such as mental disease, inflammations, allergies, and gastrointestinal hypermotility.

The activity of the compounds of the invention as enzyme inhibitors also makes them valuable as laboratory agents. Thus the compounds of the invention can be used in the research laboratory to inhibit selectively monoamine oxidase and/or decarboxylase enzymes in mixed enzyme systems. They can also be used in the characterization and quantitative determination of monoamine oxidase and decarboxylase enzymes in the laboratory.

The compounds of the invention also exhibit hypotensive activity. Some of the compounds, particularly those wherein Y represents hydrogen in Formula I above, exhibit diuretic activity. These compounds are characterized by the fact that they not only increase the output of urine but also increase the excretion of electrolytes, in particular, of sodium ions. Further, the compounds of the invention are characterized by almost complete absence of amphetamine-like activity, which activity is associated with related hydrazine compounds.

The novel compounds of the invention are also useful as intermediates in chemical synthesis. For example, the compounds of the invention can be treated with acids, preferably in the form of their chlorides or anhydrides, to form the corresponding hydrazides. Illustratively, the compounds of the invention having Formula I in which R is hydrogen, can be treated with isonicotinoyl chloride to form o-alkoxyphenyl and o,o'-dialkoxyphenyl derivatives of isonicotinic acid 2-isopropylhydrazide (iproniazid), which compound is used widely in the treatment of mental disease. Further the compounds of the invention can be reacted with yohimbine to form the corresponding yohimbic acid hydrazides according to U.S. Patent 2,726,243.

The novel compounds of the invention having the Formula I above in which R represents hydrogen can be prepared in a convenient manner by reacting the appropriate o-alkoxyphenylacetone or o,o'-dialkoxyphenylacetone with hydrazine to form the corresponding o-alkoxyphenylacetone hydrazone or o,o'-dialkoxyphenylacetone hydrazone, and subjecting the hydrazone so obtained to catalytic hydrogenation to obtain the desired compound having the Formula I above. The reaction of the appropriately substituted phenylacetone with the hydrazine (preferably in the form of its hydrate) can be carried out advantageously by mixing the reactants in solution in an inert solvent such as methanol, ethanol, isopropyl alcohol, ethyl acetate, dioxane, and the like. The reaction can be carried out at room temperature (about 20 to 30° C.), but in order to increase the reaction rate it is preferred to employ elevated temperatures, such as the boiling point of the mixture at atmospheric pressure. If desired, the hydrazone so formed can be isolated, for example, by evaporation of the reaction mixture, and purified, for example, by fractional distillation in vacuo. However, it is generally unnecessary to isolate or purify the hydrazone. The reaction mixture obtained as described above can be subjected directly to catalytic hydrogenation using catalysts such as platinum oxide. Preferably the reaction mixture obtained in the formation of the hydrazone is acidified, for example, by the addition of at least a stoichiometric amount of acetic acid, before being subjected to hydrogenation. After hydrogenation is complete the desired compound having the Formula I above in which R represents hydrogen can be isolated from the reaction mixture, for example, by filtration of the mixture to remove the catalyst and evaporation of the filtrate to dryness. The crude product so obtained can be purified by conventional procedures, for example, by conversion to the free base followed by distillation, or by conversion to a crystalline acid addition salt.

The o-alkoxyphenylacetones and o,o'-dialkoxyphenylacetones which are employed as starting materials in the process described above, can themselves be obtained readily from the corresponding o-alkoxybenzaldehydes and o,o'-dialkoxybenzaldehydes by the process described in U.S. Patent 2,557,051 for the preparation of o-methoxyphenylacetone from o-methoxybenzaldehyde by condensation of the latter with nitroethane in the presence of butylamine, followed by reductive hydrolysis of the intermediate nitropropene. The o-alkoxybenzaldehydes employed as starting materials in this process, many of which have been described in the literature, can be obtained readily by etherification of salicylaldehyde, for example, by treatment of the sodium derivative of salicylaldehyde with the appropriate alkyl halide. In similar manner the o,o'-dialkoxybenzaldehydes employed as starting materials in the above process can be obtained by etherification of 2,6-dihydroxybenzaldehyde (J. Chem. Soc. 1938, 1828). The o,o'-dialkoxybenzaldehydes can also be prepared by reaction of the corresponding m-dialkoxybenzenes with phenyllithium and decomposition of the intermediate lithium complex with formanilide according to the procedure described by Wittig, Angew. Chem. 53, 241 (1940), for the preparation of o,o'-dimethoxybenzaldehyde from m-dimethoxybenzene.

The compounds of the invention having the Formula I above in which R represents alkyl can be prepared by converting an amine having the general formula:

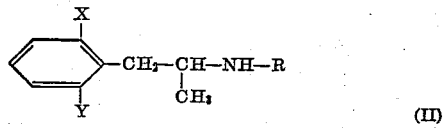

(II)

wherein X and Y have the significance hereinbefore defined and R represents an alkyl group containing from 1 to 3 carbon atoms, inclusive, to the corresponding N-nitroso compound and reducing the latter compound to the desired compound having the Formula I. The conversion of the Compound II to the corresponding N-nitroso compound can be effected in a convenient manner by treating an aqueous solution of the Compound II, preferably in the form of an acid addition salt such as the hydrochloride, sulfate, and the like, with nitrous acid, for example, by the addition of a nitrite such as sodium nitrite, barium nitrite, and the like, in the presence of a mineral acid such as sulfuric acid, hydrochloric acid, and the like. The reaction is preferably carried out at a temperature within the range of about 5° C. to about 20° C. Advantageously the nitrite is employed in excess of the molar proportion and preferably the nitrite is employed in an amount representing about 2.5 times the molar proportion, based on the amount of Compound II. The N-nitroso compound so obtained can be isolated from the reaction mixture by conventional procedures, for example, by extraction with a suitable solvent such as ether. The N-nitroso compound is generally employed without purification in the next stage of the synthesis. The N-nitroso compound can be reduced to the desired compound having the Formula I above in a convenient manner by treatment with lithium aluminum hydride in a suitable solvent such as anhydrous ether. The reduction is preferably carried out at elevated temperatures, for example, at the reflux temperature of the reaction mixture. Advantageously the lithium aluminum hydride is present in an amount slightly in excess (e.g., 20% to 30% in excess) of the molar proportion, based on the N-nitroso compound. The desired compound having the Formula I above in which R represents alkyl can be isolated from the reaction mixture by decomposing the latter with water, separating the organic phase, drying the latter, and removing the solvent by distillation. The product so obtained can be purified by conventional procedures, for example, by distillation.

The compounds having the Formula II above which are employed as starting materials in the above-described synthesis can be obtained readily by reductive amination of the corresponding o-alkoxyphenylacetone or o,o'-dialkoxyphenylacetone, using the appropriate alkylamine, according to the procedure described by Heinzelman, J. Am. Chem. Soc. 75, 921 (1953) for the preparation of N-[β-(o-methoxyphenyl)-isopropyl]methylamine from o-methoxyphenylacetone and methylamine.

The acid addition salts of the invention comprise the salts of free bases having the Formula I with organic and inorganic monobasic and polybasic acids. Advantageously acids such as hydrochloric, hydrobromic, hydriodic, sulfuric, phosphoric, nitric, acetic, benzoic, salicylic, glycolic, succinic, nicotinic, ascorbic, tartaric, maleic, malic, lactic, alginic, cyclohexylsulfamic acids, and like pharmacologically acceptable acids are used, especially when the acid addition salt is intended for therapeutic use. The acid addition salts of the invention can be prepared in a convenient manner by reacting stoichiometric proportions of the acid and a free base compound having the Formula I in the presence of a suitable solvent such as water, dioxane, ethyl acetate, methanol, ethanol, isopropyl alcohol, ether, and the like.

When used in therapy the novel compounds of the invention, in free base form or in the form of pharmacologically acceptable acid addition salts, can be combined with solid or liquid pharmaceutical carriers and formulated in the form of tablets, powder packets, or capsules, using starch and like excipients, or dissolved or suspended in suitable solvents or vehicles, for oral or parenteral administration.

The following examples are illustrative of the processes and products of the present invention, but are not to be construed as limiting.

EXAMPLE 1

*1-(o-methoxyphenyl)-2-hydrazinopropane and the hydrochloride thereof*

A solution of 25 g. (0.5 mole) of hydrazine hydrate in 75 ml. of methanol was added rapidly, in one batch, to a refluxing solution of 82 g. (0.5 mole) of o-methoxyphenyl-acetone (U.S. 2,557,051) in 150 ml. of methanol. After the initial reaction had subsided, the solution was heated for 1 hour under reflux and then cooled to about 25° C. The cooled solution was mixed with 1 g. of platinum oxide catalyst and 35 g. (0.58 mole) of glacial acetic acid, and the mixture was treated with hydrogen at an initial pressure of 50 p.s.i. The absorption of 1 molar equivalent of hydrogen was complete in 3 hours. The catalyst was removed by filtration, and the filtrate was concentrated and made alkaline by the addition of an excess of a 20% aqueous solution of sodium hydroxide. The resulting mixture was extracted with 3 portions, each of 100 ml., of chloroform. The combined chloroform extracts were washed with water, and dried over anhydrous sodium sulfate. The dried solution was filtered, the filtrate was evaporated to dryness, and the residue was distilled in vacuo. The fraction having a boiling point of 85 to 105° C. at a pressure of 0.08 mm. of mercury was collected. There was thus obtained 1-(o-methoxyphenyl)-2-hydrazinopropane in the form of an oil. The oil was dissolved in anhydrous ether and the solution was treated with an equivalent of ethereal hydrogen chloride. The solid which separated was isolated by filtration, washed with ether, and recrystallized from ethyl acetate. There was thus obtained 44.2 g. of 1-(o-methoxyphenyl)-2-hydrazinopropane hydrochloride in the form of a crystalline solid having a melting point of 108 to 110° C.

*Analysis.*—Calcd. for $C_{10}H_{16}N_2O \cdot HCl$: C, 55.42; H, 7.91; N, 12.93; Cl, 16.36. Found: C, 55.31; H, 8.21; N, 12.99; Cl, 16.26.

EXAMPLE 2

*1-(o-ethoxyphenyl)-2-hydrazinopropane and the hydrochloride thereof*

In the manner described in Example 1, but substituting o-ethoxyphenylacetone [prepared from o-ethoxybenzaldehyde (Beilsteins Handbuch der Organischen Chemie, vol. 8, p. 43, 1925, 4th edition) by the method described in U.S. Patent 2,557,051] for o-methoxyphenylacetone, there is prepared 1-(o-ethoxyphenyl)-2-hydrazinopropane and the hydrochloride thereof.

EXAMPLE 3

*1-(o,o'-dimethoxyphenyl)-2-hydrazinopropane and the hydrochloride thereof*

A. O,O'-DIMETHOXYPHENYLACETONE

A mixture of 48 g. (0.29 mole) of o,o'-dimethoxybenzaldehyde (Wittig, supra), 78 ml. of toluene, 6 ml. of n-butylamine, and 26.6 g. (0.354 mole) of nitroethane was heated under reflux (about 9 hours) until the theoretical amount of water had been collected in a water trap. The solution of 1-(o,o'-dimethoxyphenyl)-2-nitro-1-propene so obtained was mixed with 118 g. of 100-mesh iron powder, 1.2 g. of ferric chloride hexahydrate, and 300 ml. of water. The mixture was heated to 65° C. and stirred whilst 103 ml. of concentrated hydrochloric acid was added over a period of 1 hour. During the addition of the acid refluxing began, and after the addition was complete the mixture was heated under reflux for an additional 45 minutes. The resulting mixture was subjected to steam distillation until 2.5 liters of distillate has been collected. The organic layer of the distillate was separate and the aqueous layer was extracted with benzene. The organic layer and the benzene extract were combined, washed with a 3% aqueous solution of sodium bisulfite, dried over anhydrous magnesium sulfate, and evaporated. The residue was distilled in vacuo. There was thus obtained 67.5 g. of o,o'-dimethoxyphenylacetone in the form of a colorless oil having a boiling point of 81 to 85° C. at a pressure of 0.25 to 0.45 mm. of mercury.

*Analysis.*—Calcd. for $C_{11}H_{14}O_3$: C, 68.02; H, 7.27. Found: C, 67.86; H, 7.17.

The above ketone yielded a semicarbazone which, after recrystallization from ethanol, had a melting point of 196 to 197° C.

*Analysis.*—Calcd. for $C_{12}H_{17}N_3O_3$: N, 16.72. Found: N, 16.49.

B. 1-(O,O'-DIMETHOXYPHENYL)-2-HYDRAZINOPROPANE HYDROCHLORIDE

A refluxing solution of 13.0 g. (0.067 mole) of o,o'-dimethoxyphenylacetone (prepared as described above) in 30 ml. of acetone was treated with a solution of 3.4 g. (0.067 mole) of hydrazine hydrate in 15 ml. of methanol. The mixture was heated under reflux for 1 hour, then cooled to about 25° C. The cooled solution was mixed with 1 g. of platinum oxide catalyst and 5.0 g. of glacial acetic acid, and the mixture was treated with hydrogen at an initial pressure of 50 p.s.i. The absorption of 1 molar equivalent of hydrogen was complete in 3 hours. The catalyst was removed by filtration, and the filtrate was concentrated and made alkaline by the addition of an excess of a 20% aqueous solution of sodium hydroxide. The resulting mixture was extracted with 3 portions, each of 100 ml., of chloroform. The combined chloroform extracts were washed with water, and dried over anhydrous sodium sulfate. The dried solution was filtered, the filtrate was evaporated to dryness, and the residue was distilled in vacuo. There was thus obtained 1-(o,o'-dimethoxyphenyl)-2-hydrazinopropane in the form of an oil having a boiling point of 104 to 125° C. at a pressure of 0.05 mm. of mercury. The oil was dissolved in anhydrous ether and the solution was treated with an equivalent of ethereal hydrogen chloride. The solid which separated was isolated by filtration, washed with ether, and recrystallized twice from ethyl acetate. There was thus obtained 5.1 g. of 1-(o,o'-dimethoxyphenyl)-2-hydrazinopropane hydrochloride in the form of a crystalline solid having a melting point of 114 to 116° C.

*Analysis.*—Calcd. for $C_{11}H_{18}N_2O_2 \cdot HCl$: C, 53.54; H, 7.76; N, 11.36; Cl, 14.37. Found: C, 53.57; H, 7.66; N, 11.07; Cl, 14.35.

EXAMPLE 4

*1-(o-methoxy-α-methylphenethyl)-1-methylhydrazine hydrochloride*

A solution of 43.2 g. (0.2 mole) of N-[β-(o-methoxyphenyl)isopropyl]methylamine hydrochloride (Heinzelman, supra) in 170 ml. of water was treated with 51 g. of 30% sulfuric acid. The solution was maintained at 5 to 10° C. and stirred during the addition of a solution of 34 g. (0.5 mole) of sodium nitrite in 60 ml. of water over a period of 30 minutes. After the addition was complete the mixture was stirred for 2 hours at approximately 20° C. and then extracted with 2 portions, each of 250 ml., of ether. The combined ether extracts were washed with 50 ml. of 40% aqeueous potassium hydroxide solution, dried over anhydrous potassium carbonate, and evaporated. There was thus obtained 27.3 g. of N-nitroso-N-methyl-1-(o-methoxyphenyl)-2-propylamine. The latter was dissolved in 300 ml. of anhydrous ether and the solution so obtained was added slowly, over a period of 1 hour, to a stirred solution of 8.7 g. (0.23) of lithium aluminum hydride in 500 ml. of anhydrous ether. After the addition was complete the mixture was stirred and heated under reflux for 1 hour before being cooled and decomposed by the careful addition of 22 g. (0.25 mole) of ethyl acetate followed by 45 g. (2.5 moles) of water. The resulting mixture was filtered and the filtrate was dried over anhydrous magnesium sulfate. The dried solution was filtered and the filtrate was evaporated. The residue was distilled in vacuo. There was thus obtained 15.6 g. of 1-(o-methoxy-α-methylphenethyl)-1-methylhydrazine in the form of an oil having a boiling point of 85 to 100° C. at a pressure of 0.06 to 0.07 mm. of mercury. The oil so obtained was dissolved in anhydrous ether and the ethereal solution was treated with a slight excess of an ethereal solution of hydrogen chloride. The solid which separated was isolated by filtration and was recrystallized from ethyl acetate and then from isopropyl alcohol. There was thus obtained 8.5 g. of 1-(o-methoxy-α-methylphenethyl)-1-methylhydrazine hydrochloride in the form of a crystalline solid having a melting point of 141 to 142° C.

*Analysis.*—Calcd. for $C_{11}H_{18}N_2O \cdot HCl$: C, 57.25; H, 8.30; N, 12.14; Cl, 15.37. Found: C, 57.44; H, 8.16; N, 12.14; Cl, 15.36.

Example 5

1-(o-methoxy-α-methylphenethyl)-1-isopropyl-hydrazine hydrochloride

In the manner described in Example 4, but substituting N-[β-(o-methoxyphenylisopropyl]isopropylamine hydrochloride (Heinzelman, supra) for N-[β-(o-methoxyphenyl)isopropyl]-methylamine hydrochloride, there was obtained 1-(o-methoxy-α-methylphenethyl)-1-isopropylhydrazine hydrochloride.

Example 6

1-(o-isopropoxyphenyl)-2-hydrazinopropane and the hydrochloride thereof

In the manner described in Example 1, but replacing o-methoxyphenylacetone by o-iso propoxyphenylacetone (prepared by treating the sodium derivative of salicylaldehyde with isopropyl bromide and subjecting the o-isopropoxybenzaldehyde so obtained to the process described in U.S. Patent 2,557,051) there was obtained 1-(o-isopropoxyphenyl)-2-hydrazinopropane and the hydrochloride thereof.

Example 7

1-(o-ethoxy-α-methylphenethyl)-1-methylhydrazine hydrochloride

Using the procedure described in Example 4, but replacing N-[β-(o-methoxyphenyl)isopropyl]methylamine hydrochloride by N-[β-(o-ethoxyphenyl)isopropyl]methylamine hydrochloride (prepared from o-ethoxyphenylacetone and methylamine using the process described by Heinzelman, supra), there was obtained 1-(o-ethoxy-α-methylphenethyl)-1-methylhydrazine hydrochloride.

Example 8

1-(o,o'-dimethoxy-α-methylphenethyl)-1-methylhydrazine hydrochloride

Using the procedure described in Example 4, but replacing N-[β-(o-methoxyphenyl)isopropyl]methylamine hydrochloride by N-[β-(o,o'-dimethoxyphenyl)isopropyl] methylamine hydrochloride (prepared from o,o'-dimethoxyphenylacetone and methylamine using the process described by Heinzelman, supra), there was obtained 1-(o,o'-dimethoxy-α-methylphenethyl)-1-methyldrazine hydrochloride.

Example 9

1-(o-methoxyphenyl)-2-hydrazinopropane dihydrogen phosphate

A. ETHEREAL SOLUTION OF 1-(O-METHOXYPHENYL)-2-HYDRAZINOPROPANE

A solution of 15 g. of 1-(o-methoxyphenyl)-2-hydrazinopropane hydrochloride (prepared as described in Example 1) in 200 ml. of water was made alkaline by the addition of aqueous sodium hydroxide solution. The oil which separated was extracted in chloroform; the chloroform extract was washed with water and dried over anhydrous magnesium sulfate. The dried solution was filtered and the filtrate was evaporated to dryness. The residue was dissolved in anhydrous ether and the solution was diluted with anhydrous ether to give a total volume of 100 ml. Aliquots of the solution so obtained were employed in the preparation of salts as described in Part B below in subsequent examples.

B. 1-(O-METHOXYPHENYL)-2-HYDRAZINOPROPANE DIHYDROGEN PHOSPHATE

To a solution of 3.4 g. (0.03 mole) of 86.7% orthophosphoric acid in 200 ml. of anhydrous ether was added, with stirring, 33 ml. of the ethereal solution of 1-(o-methoxyphenyl)-2-hydrazinopropane (representing 0.0231 mole of base) prepared as described in Part A above. The gummy solid which separated was triturated with fresh anhydrous ether until completely solid and was then isolated by filtration. There was thus obtained 6.2 g. of material having a melting point of 132 to 150° C. This material was recrystallized twice from 95% ethanol. There was thus obtained 4.7 g. of 1-(o-methoxyphenyl)-2-hydrazinopropane dihydrogen phosphate in the form of a crystalline solid having a melting point of about 135 to 145° C.

*Analysis.*—Calcd. for $C_{10}H_{16}N_2O \cdot H_3PO_4$: C, 43.16; H, 6.88; N, 10.07; P, 11.13. Found: C, 43.01; H, 7.08; N, 10.13; P, 11.00.

Example 10

1-(o-methoxyphenyl)-2-hydrazinopropane hydrobromide

A portion of 33 ml. of the ethereal solution of 1-(o-methoxyphenyl)-2-hydrazinopropane (representing 0.0231 mole of base), prepared as described in Example 9, Part A, was diluted to 500 ml. by the addition of anhydrous ether. The solution so obtained was treated with an excess of gaseous hydrogen bromide and the solid which separated was isolated by filtration and recrystallized four times from ethyl acetate. There was thus obtained 3.4 g. of 1-(o-methoxyphenyl)-2-hydrazinopropane hydrobromide in the form of a crystalline solid having a melting point of 119 to 120° C.

*Analysis.*—Calcd. for $C_{10}H_{16}N_2O \cdot HBr$: C, 45.99; H, 6.56; N, 10.73; Br, 30.60. Found: C, 46.09; H, 6.56; N, 10.77; Br, 30.77.

Example 11

1-(o-methoxyphenyl)-2-hydrazinopropane hydrogen maleate

To a solution of 2.7 g. (0.0231 mole) of maleic acid in 150 ml. of anhydrous ether was added 33 ml. of the ethereal solution of 1-(o-methoxyphenyl)-2-hydrazinopropane (representing 0.0231 mole of base) prepared as described in Example 9, Part A. The resulting solution was cooled to 0° C. and the solid which separated was isolated by filtration. There was thus obtained 6.1 g. of material having a melting point of 80 to 82° C. This material was recrystallized from ethyl acetate to obtain 5.1 g. of 1-(o-methoxyphenyl)-2-hydrazinopropane hydrogen maleate in the form of a crystalline solid having a melting point of 81 to 82° C.

*Analysis.*—Calcd. for $C_{10}H_{16}N_2O \cdot C_4H_4O_4$: C, 56.74; H, 6.80; N, 9.46. Found: C, 56.92; H, 7.17; N, 9.68.

Example 12

1-(o-methoxphenyl)-2-hydrazinopropane cyclohexylsulfamate

An ethereal solution of 1-(o-methoxyphenyl)-2-hydrazinopropane (0.0231 mole), prepared from 5 g. of 1-(o-methoxyphenyl)-2-hydrazinopropane hydrochloride using the procedure described in Example 9, Part A, was added to a solution of 4.15 g. (0.0231 mole) of cyclohexylsulfamic acid in 50 ml. of isopropyl alcohol. The resulting solution was evaporated to dryness. The residue was dissolved in a small quantity of ether and the solution was treated with an excess of Skellysolve B (a mixture of hexanes). The oil which separated was triturated until crystalline and the crystals were isolated by filtration. There was thus obtained 7.5 g. of material having a melting point of 80 to 82° C. This material was recrystallized from a mixture of ethyl acetate and Skellysolve B to obtain 5.7 g. of 1-(o-methoxyphenyl)-2-hydrazinopropane cyclohexylsulfamate having a melting point of 81 to 83° C.

Example 13

Ten thousand (10,000) tablets for oral use, each containing 25 mg. of 1-(o-methoxyphenyl)-2-hydrazinopropane hydrochloride, are prepared from the following types and amounts of materials:

| | G. |
|---|---|
| 1-(o-methoxyphenyl)-2-hydrazinopropane hydrochloride | 250 |
| Starch U.S.P. | 170 |
| Talc U.S.P. | 130 |
| Lactose U.S.P. | 2600 |
| Sucrose Powder U.S.P. | 37 |
| Calcium Stearate | 19.5 |

The finely powdered lactose and sucrose are mixed well and the mixture is granulated with 10% starch paste. The wet mass is forced through an 8-mesh screen, dried at 120° F. in a forced-air oven, and then put through a 16-mesh screen. The remainder of the ingredients, in fine powder form, are mixed well and then mixed with the dried lactose granules. The final mixture is then compressed into tablets of the proper weight.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound selected from the class consisting of (a) a compound having the general formula:

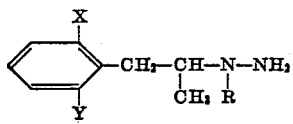

wherein X represents an alkoxy group containing from 1 to 3 carbon atoms, inclusive, Y is selected from the class consisting of hydrogen and alkoxy containing from 1 to 3 carbon atoms, inclusive, and R is selected from the class consisting of hydrogen and alkyl containing from 1 to 3 carbon atoms, inclusive, and (b) the pharmacologically acceptable acid addition salts thereof.

2. 1-(o-methoxyphenyl)-2-hydrazinopropane.
3. 1-(o-methoxyphenyl)-2-hydrazinopropane hydrochloride.
4. 1-(o,o'-dimethoxyphenyl)-2-hydrazinopropane.
5. 1-(o,o'-dimethoxyphenyl)-2-hydrazinopropane hydrochloride.
6. 1-(o-methoxy-α-methylphenethyl)-1-methylhydrazine.
7. 1-(o-methoxy-α-methylphenethyl)-1-methylhydrazine hydrochloride.

References Cited in the file of this patent

UNITED STATES PATENTS

| 2,305,748 | Vargha | Dec. 22, 1942 |
| 2,703,751 | Sharp | Mar. 8, 1955 |
| 2,802,031 | Horvitz | Aug. 6, 1957 |

OTHER REFERENCES

Sidgwick: Org. Chem. of Nitrogen, Clarendon Press, Oxford, p. 380 (1945).

Karrer: Organic Chemistry, 4th Eng. Ed., Elsevier Pub. Co., New York, p. 130 (1950).

Byrket et al.: Indust. and Eng. Chem., vol. 42, pages 1863–1865 (1950).